United States Patent [19]

Saxton

[11] 4,207,780
[45] Jun. 17, 1980

[54] MULTI-SPEED PLANETARY DRIVE AXLE ASSEMBLY

[75] Inventor: Floyd G. Saxton, Rochester, Mich.

[73] Assignee: Rockwell International Corporation, Pittsburgh, Pa.

[21] Appl. No.: 876,962

[22] Filed: Feb. 13, 1978

Related U.S. Application Data

[63] Continuation of Ser. No. 709,447, Jul. 28, 1976, abandoned.

[51] Int. Cl.² ............................................. F16H 1/44
[52] U.S. Cl. ..................................... 74/710.5; 74/695
[58] Field of Search .............................. 74/695, 710.5

[56] References Cited

U.S. PATENT DOCUMENTS

| 2,783,661 | 3/1957 | Dryer | 74/695 |
|---|---|---|---|
| 3,031,900 | 5/1962 | Stump | 74/695 |
| 3,195,371 | 7/1965 | Christie | 74/695 |
| 3,265,173 | 8/1966 | Russell | 74/710.5 |
| 3,413,873 | 12/1968 | Bixby | 74/695 |
| 3,503,280 | 3/1970 | Bopp | 74/695 |

Primary Examiner—C. J. Husar
Assistant Examiner—Frank McKenzie

[57] ABSTRACT

A two speed planetary drive axle assembly comprises a differential carrier fixed over and extending within a drive axle housing. The carrier mounts a differential case connected by a pinion and ring gear to the engine driven propeller shaft. The case contains a differential mechanism connected between two drive axle shafts and constitutes a carrier for planet gears constantly meshed with an internal ring gear rigid with the differential case. The sun gear is in the form of a sleeve concentric with one of the drive axle shafts and selectively movable between two axially spaced operative positions within the axle housing. A fixed abutment is provided to limit axial movement of the sun gear in the direction of the differential mechanism to prevent the sun gear from contacting the differential mechanism. Additional abutment means limit movement of the sun gear in the other direction. The sun gear sleeve is thus positively stopped by the operating mechanism at each of the axially spaced operative positions.

6 Claims, 2 Drawing Figures

MULTI-SPEED PLANETARY DRIVE AXLE ASSEMBLY

This is a continuation of application Ser. No. 709,447, filed July 28, 1976, now abandoned.

BACKGROUND OF THE INVENTION

1. Field of the Invention

The invention relates to a two speed planetary gear drive axle assembly wherein a slidable sun gear is moved between two axially spaced operative positions and, more specifically, to means for preventing the sun gear from contacting the differential mechanism.

2. Description of the Prior Art

U.S. Pat. No. 3,413,873 which issued to L. A. Bixby on Dec. 3, 1968 discloses a two speed planetary drive axle of the type to which the present invention is particularly applicable. The Bixby patent discloses a sleeve type sun gear which is axially movable between a high speed position where the sun gear sleeve is locked in position to rotate with the planetary gear support and a low speed position where the sleeve is locked against rotation relative to the axle housing. The sun gear sleeve is concentric with one of the drive axle shafts and axially movable between the aforesaid positions by means of a yoke pivotally mounted to the differential carrier. The yoke may be moved by an air motor or a solenoid and, prior to the present invention, the sun gear sleeve has been moved in one direction until it contacts a side gear of the differential mechanism. This applies an undesirable thrust to the differential mechanism and, when the side gear and sun gear sleeve are rotating at different speeds, the friction between the two gears increases the temperature within the differential case and causes unnecessary wear of the associated parts.

SUMMARY OF THE INVENTION

The invention provides a multi-speed drive axle assembly wherein the differential and planetary gear mechanism are mounted within a differential case rotatably mounted within a carrier secured to the drive axle housing. The sun gear is movable between two axially spaced operative positions within the axle housing and stop means are provided which limit axial movement of the sun gear in the direction of the differential mechanism to prevent the sun gear from contacting the differential mechanism. The sun gear is moved by a yoke and an abutment fixed within the axial housing limits movement of the yoke in one direction.

In the preferred embodiment, a lock plate is rigidly secured to the differential carrier and serves as the abutment limiting movement of the yoke and sun gear in the direction of the differential mechanism. Additional abutment means rigid with the axle housing are also provided for limiting movement of the yoke and sun gear in the other direction.

The invention and the advantages provided thereby will be more readily understood from the following description and claims.

BRIEF DESCRIPTION OF THE DRAWINGS

Referring to the drawings wherein like numerals designate like parts.

DESCRIPTION OF THE PREFERRED EMBODIMENT

Figure 1:
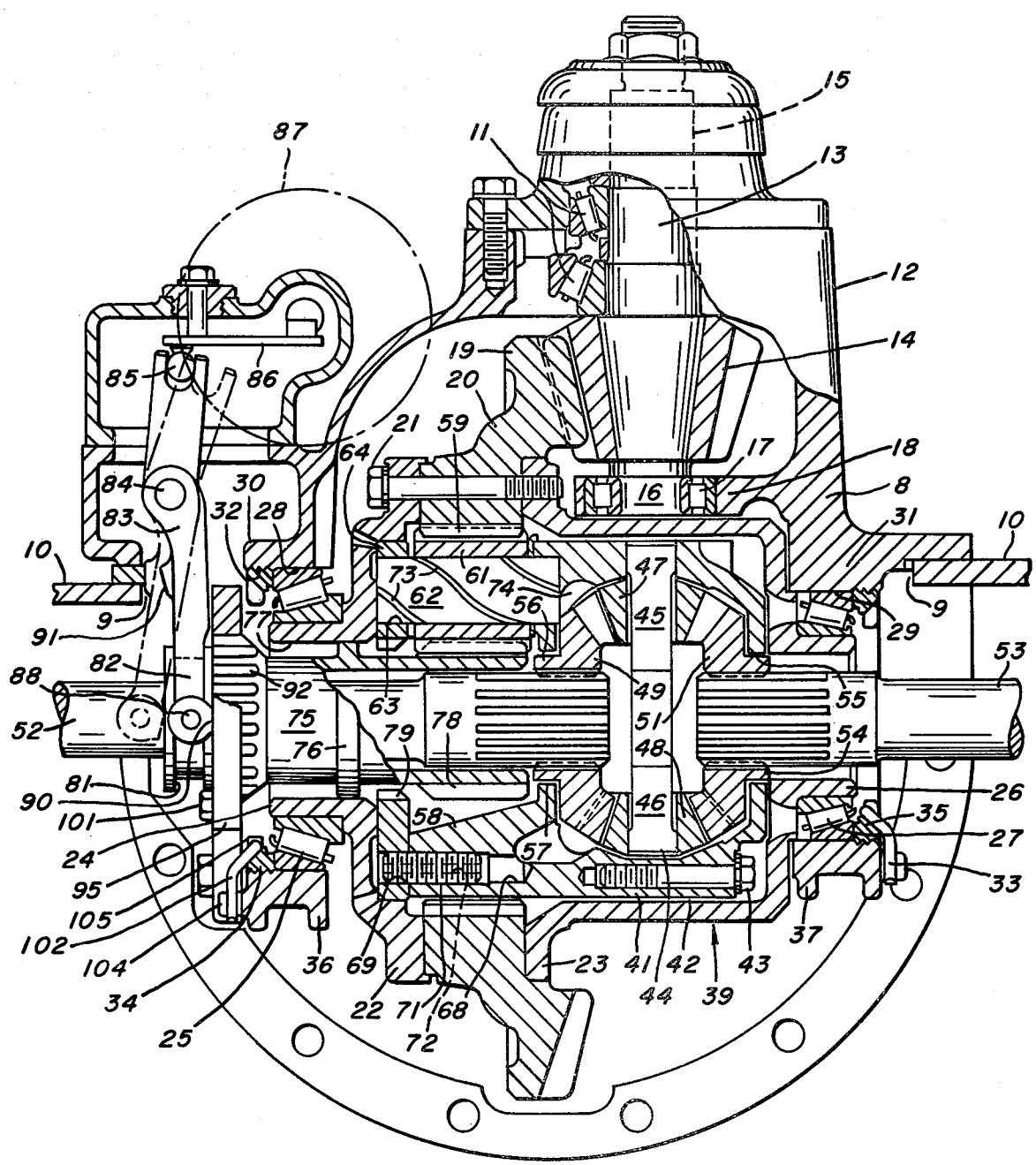
FIG. 1 is a plan view partly cut away and sectioned showing a two speed planetary drive assembly for a vehicle drive axle.

In FIG. 1 there is shown a two speed planetary drive axle assembly mounted to a vehicle axle housing 10. The planetary gear and the differential mechanism are rotatably mounted within a differential carrier 8 which, in turn, is mounted to extend over the front opening 9 of axle housing 10 where it is rigidly secured in conventional manner by a plurality of bolts. The differential carrier 8 is formed with a reduced forwardly extending neck portion 12. An input pinion shaft 13 is rotatably mounted within the neck portion 12 by tapered roller bearings 11. The end 15 of pinion shaft 13 projects forwardly of the differential carrier 12 and is splined for connection to a propeller shaft by means of a universal joint connection.

The inner end 16 of pinion shaft 13 is mounted by antifriction bearings 17 in an internally projecting integral housing member 18, so that a straddle mount is provided for effective alignment retaining support of the pinion shaft.

The pinion gear 14, formed integrally with shaft 13, is constantly meshed with a bevel ring gear 19. Gear 19 has a body 20 axially clamped, as by bolt assemblies 21, between the opposite end members 22 and 23 of a differential case. As will appear, gear body 20 and the differential case end members 22 and 23 cooperate to define a rotary mounted enclosure for the differential mechanism and the planetary gear mechanism within the drive axle housing 10.

The differential case is mounted for rotation about an axis perpendicular to the plane containing the axis of pinion shaft 13, the differential case being supported at opposite ends by boss 24 of case member 22 extending into the tapered roller bearing assembly 25 and boss 26 of differential case member 23 extending into the tapered roller bearing assembly 27. Bearing assemblies 25 and 27 are coaxially mounted in aligned relation in bores 28 and 29 respectively of inwardly projecting generally parallel arms 30 and 31 formed integrally with the differential carrier 8. The outer ends of these bores are threaded at 32 and 33 to receive annular bearing adjustment and retainer nuts 34 and 35 which when properly tightened locate and preload the bearings.

Figure 2:
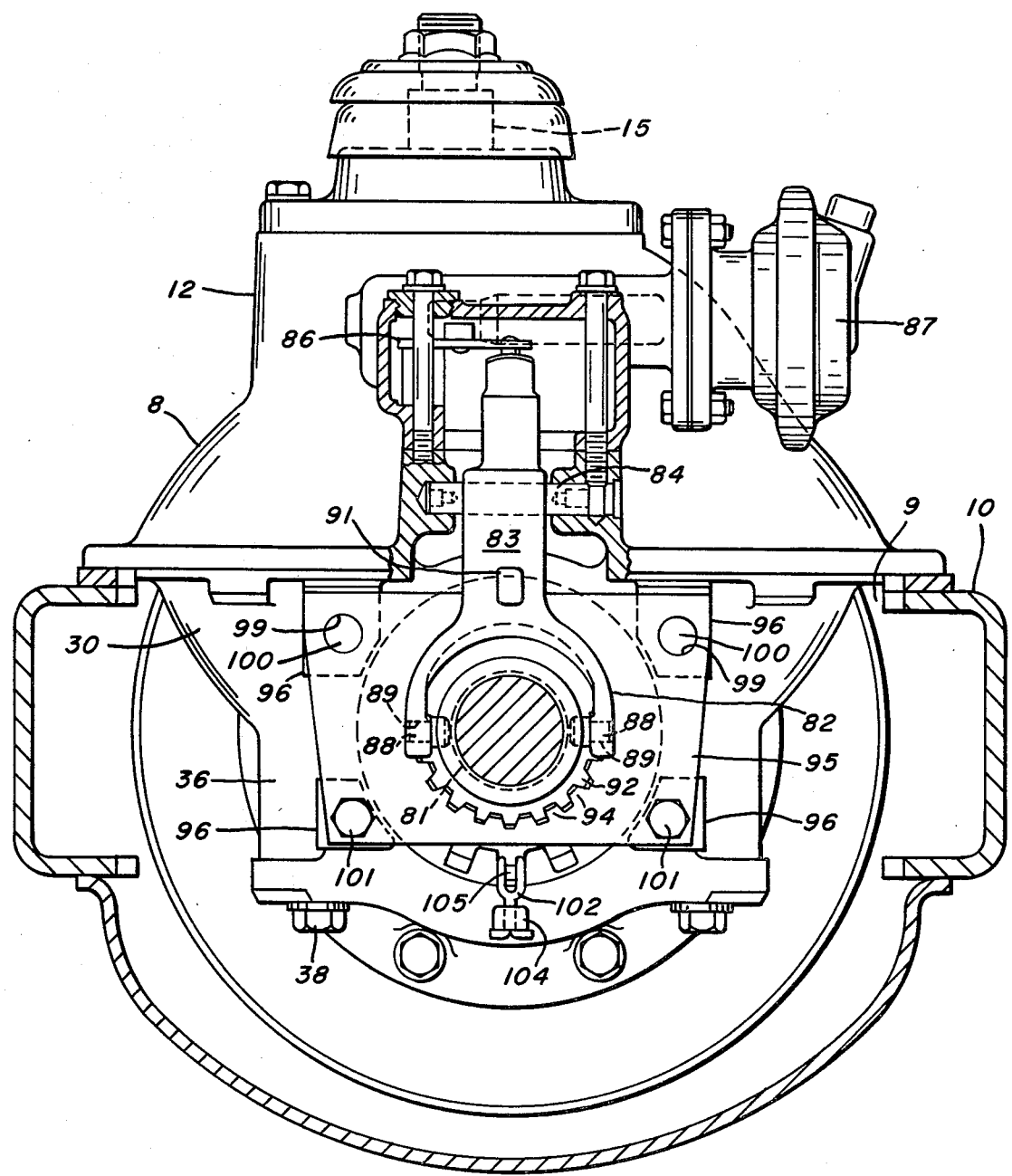
FIG. 2 is a side elevation of the drive axle assembly of FIG. 1.

Bores 28 and 29 are cylindrical, the upper halves being formed directly in arms 30 and 31 and the lower halves being formed in separable bearing caps 36 and 37 secured upon the undersides of the arms. FIG. 2 shows cap 36 secured upon arm 30 by bolts 38. Bearing cap 37 is similarly secured on arm 31. Bearing caps 36 and 37 become as integral parts of the carrier arms when bolted in place and hold the bearing assemblies to the arms.

The portion of the differential case as shown to the right in FIG. 1 surrounds a differential gear support in the form of a cage 39 comprising opposed sides 41 and 42 secured together by bolt assemblies 43 to clamp a cross member 44 between them. Two arms 45 and 46 of the cross arm member are shown rotatably mounting differential pinions indicated at 47 and 48. All four pinions are meshed with differential side gears 49 and 51 splined to oppositely extending axle drive shafts 52 and 53, respectively. Shafts 52 and 53 transmit power to the road engaging wheels rotatably mounted at the ends of the axle housing 10.

The hub 54 of gear 51 is journaled in bore 55 of the differential case side 42 and the boss 26 of differential case member 23. The hub 56 of side gear 49 is journaled coaxially in a bore 57 formed in the differential case side 41.

As shown in FIG. 1, differential cage side member 41 has an integral projecting end section 58 serving as a carrier for the planetary gearing to be described. Gear 19 is formed with a row of internal teeth 59 whereby it serves as the planetary ring gear. The internal ring gear 59 is constantly meshed with a plurality of planetary pinion gears 61 that are freely rotatably mounted on shafts 62 fixed in the planetary gear carrier 58. The planetary pinion shafts 62 extend into apertures 63 in a carrier end plate 64 that is secured to carrier 58 by a plurality of machine screws. Shafts 62 are locked against rotation relative to the planetary gear carrier 58 by conventional means. Carrier 58 is also formed with one or more axially extending through bores 68 aligned with bores 69 in the end plate for receiving dowel pins 71 having central lubricant conducting passages 72 in the form of axially extending through bores. Each planetary pinion shaft 62 is provided with a plurality of lubricant conducting helical grooves 73. The grooves 73 open into the space 74 within the differential cage and provide a conduit for lubricant to flow from that space to the bearing surfaces within the planetary pinion gears 61.

A hollow sleeve 75 is concentric with axle shaft 52 in free spaced relation thereto and is formed with a raised annular rib 76 slidably guiding it within the bore 77 of differential carrier end boss 24. At its inner end sleeve 75 is formed with a circular row of teeth 78 forming a sun gear constantly meshed with and slidable relative to the planetary pinion gears 61. Carrier end plate 64 is formed with an internal row of teeth 79 that, as will appear, are adapted to coact as clutch teeth with the sun gear teeth 78 to lock the sun gear sleeve 75 to the end plate 64 for rotation with the planetary carrier formed by end plate 64 and end section 58 of the differential cage side member 41 in one axial position of sleeve 75.

Where it projects out of the differential carrier end boss 24, sleeve 75 is formed with an annular groove 81 receiving a yoke 82 on the end of a lever 83. The lever 83 is pivotally mounted at 84 to effect movement of the yoke 82 within the axial housing 10. The yoke 82 is operatively connected to the sun gear sleeve by two pins 88 pressed to diametrically opposed apertures 89 provided to the spaced yoke arms. The inner ends of the pins are seated in the annular groove 81 and translate the arcuate movement of lever 83 into axially reciprocating movement of the sun gear sleeve 75.

The spaced ends of the yoke arms are also provided with abutments in the form of lands 90 adjacent the apertures 89. Another land in the form of a raised abutment 91 is provided on the opposite side of the lever 83. The purpose of the raised abutment 91 and the lands 90 will be described below in connection with the operation of the shaft mechanism.

The lever 83 may be actuated by electric or pneumatic means. In the preferred embodiment the lever is connected at 85 to a bell crank lever 86 which, in turn, is operated by the reciprocable plunger of a shift actuating unit in the form of an air motor.

Externally of the differential case, the sun gear sleeve 75 is formed with a row of clutch teeth 92. In FIG. 1 the clutch teeth 92 are shown engaged with a coacting row of internal clutch teeth 94 on lock plate 95 which is secured to the differential carrier.

As shown in FIG. 2, the outer side of the differential carrier is formed with four surface bosses around the bore 28. Two of the surface bosses 96 are formed on bearing cap 36 and are drilled and tapped to provided threaded bores 98. The other surface bosses 96 are formed on the differential carrier 12 and drilled to provide bores 99. The lock plate 95 is drilled to provide four holes in alignment with the bores 98 and 99. Dowel pins 100 are seated in the bores 99 to properly locate the lock plate which is secured to the carrier by bolts 101 threaded into the bores 98.

After the bearing and retainer nut 34 are tightened to properly locate and preload the bearing 25, a retainer 102 is fitted to a hollow projection 104 and engages a tang 105 on the nut 34 to hold the adjustment.

In operation, unit 87 is actuated to move the lever 83 about the pivot 84 and shift the sun gear sleeve between two axially spaced operative positions within the axle housing. In FIG. 1, the sun gear sleeve 75 is shown in the low speed position where the clutch teeth 92 of sleeve 75 are engaged with the clutch teeth 94 of lock plate 95. In this position the sun gear sleeve is locked against rotation relative to the differential carrier. Drive is transmitted through the pinion 14 to the ring gear 19 which rotates the differential cage and the idling planet gears around the sun gear teeth 78. With reference to FIG. 1, it should be noted that the lands 90 provided to the yoke 82 abut against the axially outer surface of the lock plate 95 and prevent the axial inner end of sleeve 75 from contacting the hub 56 of side gear 49. The lands 90 and lock plate 95 thus limit axial movement of the sun gear sleeve 75 and positively space the axially inner end of the sun gear sleeve from the differential mechanism side gear 49.

When the unit 87 is actuated to shift the sun gear sleeve to the other operative position, the lever 83 is moved clockwise about the pivot 84 to the position shown by phantom lines in FIG. 1 where the raised abutment 91 contacts an internal surface of the differential carrier adjacent the axle housing opening 9. In this movement, the clutch teeth 92 are withdrawn from the lock plate clutch teeth 94 and the sun gear teeth 78 are engaged with the internal row of teeth 79 provided to the planetary carrier end plate 64. In this, the high speed position, the sun gear sleeve is locked to the planetary carrier end plate and rotates with the planetary carrier. The planetary pinion gears are thus driven at a higher rate of speed between the internal ring gear teeth 59 and the rotating sun gear teeth 78.

The invention thus provides an abutment in the form of the axially outer surface of the lock plate which limits axial movement of the sun gear sleeve in the direction of the differential mechanism and prevents the sun gear from contacting the side gear of the differential mechanism. This eliminates the undesirable side thrust applied to the differential mechanism by conventional two speed planetary drive axle assemblies and prevents the undesirable temperature increase which heretofore resulted from the sun gear sleeve being urged against the differential side gears.

This invention also provides an abutment limiting movement of the actuating yoke and sun gear sleeve in the opposite direction. This permits positive operation of the yoke and movement of the sun gear sleeve between two distinct axially spaced positions within the axle housing.

The invention provides a solution to the foregoing problems and an improved mode of operation in a relatively simple and economic manner which may be readily adapted to current production as well as field replacement.

The invention may be embodied in other forms without departing from the spirit or essential characteristics thereof. The foregoing description is therefore to be considered as illustrative and non-restrictive, the scope of the invention being defined by the appended claims and all changes to the described embodiment which come within the meaning and range of equivalency of the claims are therefore intended to be embraced thereby.

What I claim as my invention is:

1. A multi-speed drive axle assembly comprising an axle housing, a differential carrier mounted to said housing, a differential case rotatably mounted within said housing, a differential mechanism within said case, said differential mechanism interconnecting oppositely extending drive axle shafts and including a gear support rotatably mounted within said differential case, a plurality of planetary gears rotatably mounted on said support, said planetary gears being constantly meshed with an internal ring gear rigid with said differential case, a sun gear concentric with one of said drive axle shafts and axially slidable relative thereto, said sun gear being constantly meshed with said planetary gears, means for locking said sun gear against rotation relative to said axle housing in one axial position of said sun gear, means for locking said sun gear for rotation with said gear support in a second axial position of said sun gear, a yoke connected to said sun gear and pivotally mounted for selectively moving said sun gear from either of said axial positions to the other axial position and a fixed abutment on said differential carrier limiting axial movement of said yoke in the direction of said differential mechanism to prevent said sun gear from contacting said differential mechanism.

2. The multi-speed drive axle assembly defined by claim 1 wherein said means for locking said sun gear against rotation is a lock plate fixed to said differential carrier and having a set of clutch teeth adapted to mesh with a set of clutch teeth on said sun gear in said one axial position and said lock plate cmprises an abutment limiting axial movement of said yoke and positively spacing said sun gear from said differential mechanism.

3. The multi-speed drive axle assembly defined by claim 2 including other abutment means rigid with said axle housing and limiting movement of said yoke in the other direction within said housing.

4. A two speed planetary drive axle assembly comprising an axle housing, a differential carrier mounted to said housing, a differential case rotatably mounted within said housing, a differential mechanism rotatably mounted within said case, said differential mechanism including side gears interconnecting oppositely extending drive axle shafts and a planetary gear support, a plurality of planetary pinion gears rotatably mounted on said support, said pinion gears being constantly meshed with an internal ring gear rigid with said differential case, a sun gear sleeve concentric with one of said drive axle shafts adjacent its respective side gear, said sun gear sleeve being constantly meshed with said planetary gears and axially movable relative to said one drive axle shaft between two axially spaced operative positions, a yoke connected to said sun gear and pivotally mounted for selectively moving said sun gear from either of said positions to the other position, a lock plate fixed to said differential carrier and abutment means on one side of said yoke and adapted to contact said lock plate and limit axial movement of said yoke in the direction of said differential mechanism to prevent said sun gear sleeve from contacting said side gear.

5. The planetary drive axle assembly defined by claim 4 including other abutment means rigid with said axle housing and limiting movement of said yoke in the other direction within said housing.

6. A two speed planetary drive axle assembly comprising an axle housing, a differential carrier mounted to said housing, a differential case rotatably mounted within said housing, a differential mechanism rotatably mounted within said case, said differential mechanism including side gears interconnecting oppositely extending drive axle shafts and a planetary gear support, a plurality of planetary pinion gears rotatably mounted on said support, said pinion gears being constantly meshed with an internal ring gear rigid with said differential case, a sun gear sleeve concentric with one of said drive axle shafts adjacent its respective side gear, said sun gear sleeve being constantly meshed with said planetary gears and axially movable relative to said one drive axle shaft between two axially spaced operative positions, a yoke connected to said sun gear and pivotally mounted for selectively moving said sun gear from either of said positions to the other position, a lock plate fixed to said differential carrier, abutment means on one side of said yoke and adapted to contact said lock plate and limit axial movement of said yoke in the direction of said differential mechanism to prevent said sun gear from contacting said side gear and abutment means on the other side of said yoke adapted to contact means rigid with said axle housing to limit movement of said yoke in the other direction within said housing.

* * * * *